United States Patent [19]

Van Steenbrugge et al.

[11] Patent Number: 5,073,773

[45] Date of Patent: Dec. 17, 1991

[54] METHOD OF ESTABLISHING A SIGNAL PATH BETWEEN AT LEAST TWO APPARATUSES AND AN ARRANGEMENT OF AT LEAST TWO APPARATUSES FOR REALISING THE METHOD

[75] Inventors: Bernard Van Steenbrugge; Egbertus J. Berkhoff, both of Eindhoven, Netherlands

[73] Assignee: U.S. Philips Corp., New York, N.Y.

[21] Appl. No.: 333,750

[22] Filed: Apr. 3, 1989

Related U.S. Application Data

[63] Continuation of Ser. No. 86,442, Aug. 17, 1987, abandoned.

[30] Foreign Application Priority Data

Aug. 18, 1986 [NL] Netherlands .................. 8602090

[51] Int. Cl.$^5$ .............................................. H01H 67/00
[52] U.S. Cl. ........................ 340/825.03; 340/825.07; 340/825.54
[58] Field of Search ............ 340/825.07, 825.08, 340/825.1, 825.12, 825.54, 825.25, 825.24; 455/5; 379/104; 358/194.1, 181; 370/31

[56] References Cited

U.S. PATENT DOCUMENTS

| | | |
|---|---|---|
| 4,185,272 | 1/1980 | Feiker .............................. 340/825.07 |
| 4,191,941 | 3/1980 | Springer et al. ................ 340/825.08 |
| 4,271,470 | 6/1981 | Dlugos et al. ............. 340/825.07 X |
| 4,488,179 | 12/1984 | Kruger et al. ...................... 358/181 |
| 4,502,026 | 2/1985 | Imazeki et al. ................. 358/181 X |
| 4,518,960 | 5/1985 | Clark .......................... 340/825.03 X |
| 4,535,401 | 8/1985 | Penn .............................. 340/825.45 X |

FOREIGN PATENT DOCUMENTS 60-93517  5/1985  Japan .

OTHER PUBLICATIONS

M. M. Mano "Computer System Architecture," Prentice-Hall, Inc. Englewood CLiffs, N.J., 1982, pp. 264-271.

Toong, H. D., "Microprocessors", Scientific American, Sep. 1977, pp. 146, 147, 151, 152, 153, 154, 155, 156, 158, 160, 161.

"Funkschau" 18/1982, pp. 50-51.

Primary Examiner—Ulysses Weldon
Attorney, Agent, or Firm—Jack D. Slobod

[57] ABSTRACT

In a system comprising a collection of signal processing apparatuses and a switching device, each apparatus is connected, by means of a universal connector which is identical for each apparatus, to an arbitrary connection of the said switching device. The signal path between two or more connected apparatuses is established in that a first apparatus supplies a report command for the switching device in a least one further apparatus, after which the switching device finds out to which connector a further apparatus is connected in that said further apparatus in reaction to the report command has supplies an identification signal as a result of which the switching signal recognises the connector to which said further apparatus is connected. Once it has been found out to which connector the first and the further apparatuses have been connected, the switching signal establishes a signal path herebetween.

24 Claims, 1 Drawing Sheet

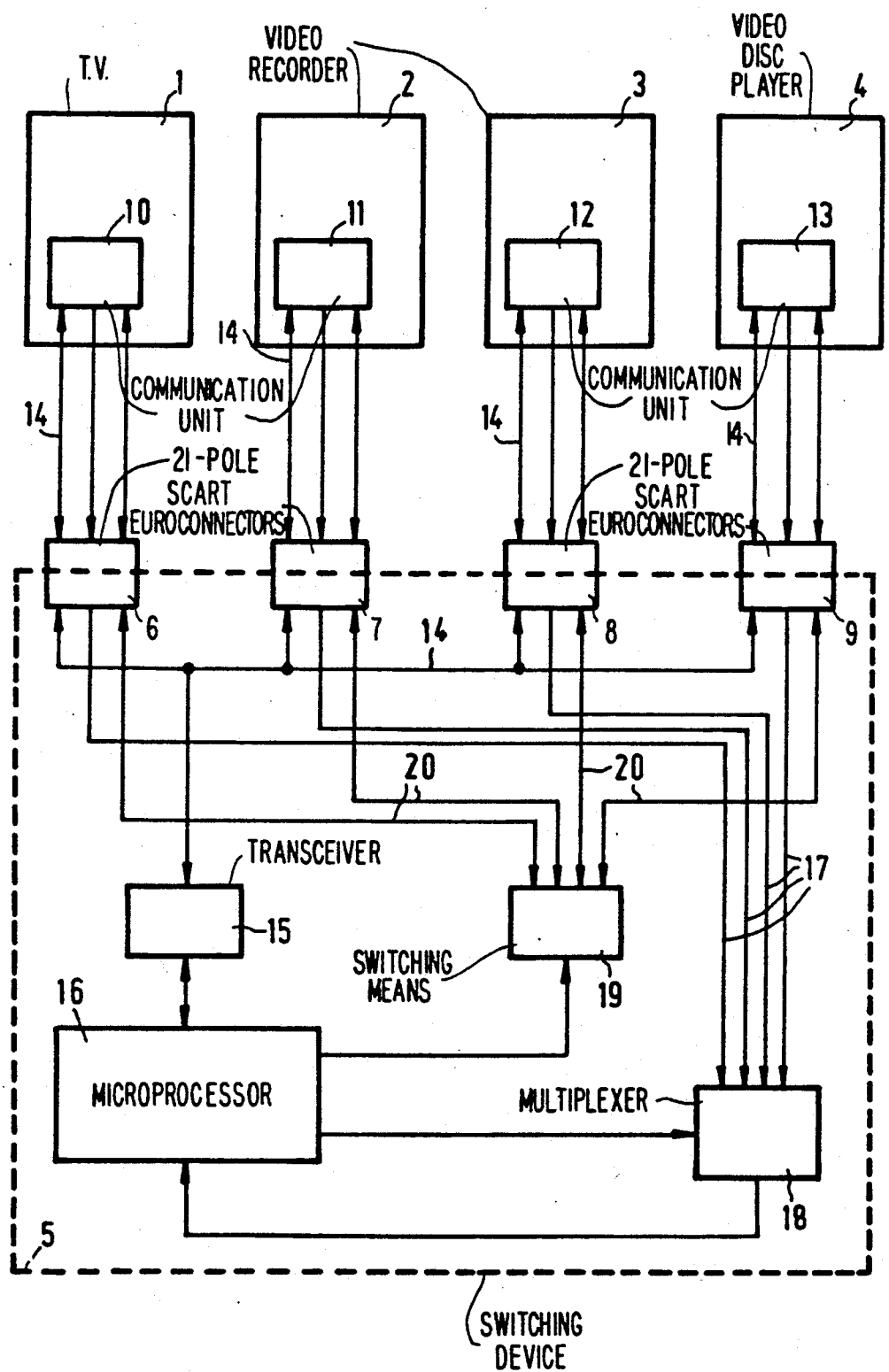

METHOD OF ESTABLISHING A SIGNAL PATH BETWEEN AT LEAST TWO APPARATUSES AND AN ARRANGEMENT OF AT LEAST TWO APPARATUSES FOR REALISING THE METHOD

This is a continuation of application Ser. No. 086,442, filed Aug. 17, 1987, now abandoned.

BACKGROUND OF THE INVENTION

1. Field of the Invention

The invention relates to a method of establishing a signal path between at least two apparatuses belonging to a collection of signal-processing apparatuses of which each apparatus is connected to a switching device by means of a respective universal connector which is identical for each apparatus, and which apparatuses and the switching device are connected to a bus for transferring commands, said method comprising the steps of:

generating, by a first apparatus of said collection, a report command for the switching device and at least one further apparatus;
supplying said report command on the bus;
generation after the report command has been supplied to the bus, of an identification signal by at least one further apparatus, which was specified in the report command, and transferring said identification signal to the switching device via a predetermined pin of the relevant connector.

The invention also relates to a set comprising a collection of signal-processing apparatuses and a switching device, in which each apparatus is connected to the switching system by means of a respective universal connector, which is identical for each apparatus.

2. Prior Art

Such a method or such a set is generally known, for example, from computer or telephone networks. The various apparatuses formed, for example, by computer stations or telephone sets are connected to a bus via which commands, for example, report commands, are transferred. The various apparatuses are also connected to a switching device (for example, an interface module or an exchange) by means of a universal connector. When a signal path is to be produced between a first apparatus and a further apparatus in order to transfer an information signal from the first to the further apparatus, a report command is then given to the switching device by said first apparatus. Said report command also comprises a key (for example, the destination address or the subscriber's number) for the further apparatus. In computer and telephony networks the locations of the first and the further apparatuses are known or the key is constructed so that the location of the further apparatuses can be simply derived herefrom. A signal path can then simply be established between the respective connectors of the apparatuses between which the information signal is to be transferred when the locations and hence the connectors to which the apparatuses are connected are unambiguously known or can be determined unambiguously. In certain apparatuses, for example audio or video apparatuses, it is known either to use for each apparatus a specific connector or to use the same universal connector for all apparatuses and to reserve a fixed connector connection for each apparatus connected to the switching device so that the connections between specific apparatuses in the switching device can be realised by means of a switch to be operated by the user.

A fixed reservation of certain connections for certain apparatuses, however, considerably restricts the flexibility in the construction of such apparatuses, and moreover it is not user-friendly. When, however, said fixed reservation for certain connections is omitted and the above-described method is used, the problem occurs that the switching system does not know to which connector an apparatus is connected. Since the locations of the apparatuses are unknown the known switching device can no longer produce the signal path.

SUMMARY OF THE INVENTION

It is the object of the invention to provide a method and an arrangement in which said method can be carried out, in which without using a fixed reservation of certain connections a signal path is established between at least two apparatuses which are each connected to the switching device by means of their respective universal connector.

For that purpose a method according to the invention is characterized in that said method comprises the further steps of:

recognition, after reception of said report command, by the switching device of the connection to which the relevant connector of the first apparatus is connected;
recognition, after reception of said identification signal, by the switching device of the connection to which the relevant connector of the further apparatus is connected;
establishing by the switching device of a signal path between the recognized connection of said first apparatus and the recognized connector of said further apparatus.

Since all the apparatuses are connected to the switching device by means of their respective universal connector the user need no longer find out to which connection a given apparatus should be connected. The switching device ensures, in cooperation with the apparatuses, that the signal path is produced. For this purpose an identification signal is conveyed to the switching device by at least one further apparatus which is specified in the report command. Since the switching device now recognises both the connection of the connector of the first and that of the further apparatus on the basis of a received report command and identification signal, respectively, the switching device is capable of establishing a signal path between these "recognised" connections.

In an arrangement according to the invention the switching device comprises detection means for detecting a report command and an identification signal, and switching means for establishing the signal path. The use of the bus for transmitting the report command presents the advantage that, independently of the connection to which the apparatus is connected, the report command can be transmitted to all apparatuses since all apparatuses and the switching device are connected to the bus. The use of a pre-determined pin for supplying the identification signal makes the detection thereof simpler since in this manner each time only one pin of the connector needs to be sensed.

A preferred embodiment of a method according to the invention is characterized in that generating said report command involves generating a connection request signal, said connection request signal being supplied to the switching device; said recognition of the relevant connector comprises the successive steps of:
reception of the connection request signal;
generating an identification request signal;
supplying said identification request signal via the bus to the first apparatus;
generation by the first apparatus upon reception of said identification request signal, of an identification signal and supplying said identification signal to the switching device via the said predetermined pin of the relevant connector of said first apparatus; sequentially sensing each time the predetermined pin of the connectors by the switching device and recognition of the relevant connector having the identification signal on said predetermined pin.

Detection of the connection to which the first apparatus is connected can as a result of this be realised in the same manner as detection of the further apparatus, which in turn enables a simplification of the detection means of the switching device.

It is favourable for the report request signal to be presented sequentially to the various further apparatuses. Recognition of the connection to which the further apparatus is connected is, as a result of this, simple to realise.

It is favourable for the identification signal to be formed by the provision of a modulation on the signal transfer via said pin. As a result of this an extra pin of the connector is not necessary for supplying the identification signal.

A preferred embodiment of an arrangement according to the invention is characterized in that the detection means comprise a third detector generator for detecting report commands and generating a report request signal which comprises a key for the further apparatuses specified in the report command, which further apparatuses each time comprise a memory element for storing an own key, which report command detector is connected to the memory element of its relevant apparatus and is provided for the detection of a received key and the comparison of the detected key with its own key and generating the recognition signal when the keys are found to correspond. Identification of the further apparatus as a result of this is simple to realise.

It is favourable for the universal connector to be a 21-pole scart euroconnector. Universal 21-pole scart euroconnectors are generally known in audio and/or video devices. These connectors are known per se and are described, for example in "Funkschau" 18/1982, pp. 50/51. In these euroconnectors the bus is connected to the pins 10 and 12 and a switching voltage is transported over pin 8. Therefore said pin 8 is suitable for supply of the identification signal hereon in the form of a modulation of the switching voltage.

BRIEF DESCRIPTION OF THE DRAWING

The invention will now be described in greater detail with reference to an embodiment shown in the accompanying drawing which represents a video arrangement in which the signal processing apparatuses are each connected to a switching device by means of a respective universal 21-pole scart euroconnector.

DETAILED DESCRIPTION OF THE PREFERRED EMBODIMENTS

In this example, four apparatuses, for example a TV set 1, two video recorders 2 and 3, and a video disc player 4, are connected to a switching device 5 by means of universal 21-pole scart euroconnectors 6–9. As regards their connections to the switching device these apparatuses may be interchanged arbitrarily since the connections and the connectors are identical.

Each apparatus comprises a communication unit 10, 11, 12 and 13, respectively, (for example a microprocessor with ab Ho interface connected thereto) which is suitable for communication with the switching device and the other apparatuses. For this purpose the communication units are connected to a bus 14 and the conductors 17 and 20. The bus 14 is, for example, a one-line bus ($D^2B$) as described in British Patent Specification No. 2074425 and its equivalent U.S. Pat. No. 4,429,384. The switching device comprises a number of connections to which the 21 pole scart euroconnectors 6–9 can be connected. A data bus transceiver 15 is connected to the bus 14 in the switching device and in turn is connected to a microprocessor 16. The conductors 17 are connected to a multiplexer 18 which has an output connected to an input of the microprocessor. The conductors 20 are connected to switching means 19 a control input of which is connected to a further control output of the microprocessor 16.

The bus 14 is connected to the pins 10 and 12 of the 21-pole scart euroconnectors. Via said bus are transmitted inter alia commands which originate from the switching device or from an apparatus and which are destined for one or more further apparatuses or for the switching device. The conductors 17 are connected to pin 8 of the 21-pole scart euroconnectors. Via said pin 8 inter alia a switching voltage is transported. The conductors 20 serve for the transport of signals, for example, video and/or audio signals, between two or more apparatuses of the arrangement. Each conductor 20 is formed by at least those signal lines which are connected to the pins 1 to 3, 6, 7, 11, 15, 19 and 20 of the 21-pole scart euroconnectors. Each of the corresponding remaining signal lines (connected to the pins 4, 5, 9, 13, 14, 16, 17, 18, 21) of the various connectors are connected together either directly or via the switching means 19.

The communication units 10, 11, 12 and 13 are each provided with a report command generator which is connected to the bus 14 and via this bus supplies report commands for the switching device and the remaining apparatuses. The report commands comprise inter alia a connection request signal, i.e. a signal destined for the switching device 5 to indicate thereto that a signal path is to be established between the apparatus which has supplied such a connection request signal and one or more further apparatuses specified in the connection request signal.

The communication units furthermore each comprise an identification signal generator an output of which is connected to pin 8 of the relevant connector. The identification signal generator is designed to supply identification signals for its apparatus, i.e. signals which are destined for switching device 5 and from which the recognition by the switching device of the connection to which the apparatus is connected becomes possible.

The switching device receives a connection request signal supplied to the bus by means of its transceiver 15 and the latter passes it on to the microprocessor 16. The identification signals are presented to the multiplexer 18. The microprocessor successively senses the various connections of the multiplexer in order to recognize via which connection an identification signal has been presented.

The microprocessor 16 comprises a detector generator which is designed for generating:

identification request signals, i.e. bus messages generated after detection of a connection request signal to request whether the apparatus which has supplied the connection request signal wants to supply an identification signal in order to find out to which connector it is connected;

detection confirmation signals, i.e. bus messages with which the switching device 5, having received an identification signal of an apparatus in question and having recognized the connector to which it is connected, requests for the removal of the identification signal from the conductor 17 on which it is set;

report request signals, i.e. bus messages generated after detection of a connection request signal or a report command, by which, by means of a key, the connected apparatuses, or those which were specified in the connection request signal, are requested to supply an identification signal.

The identification signal is preferably formed by a modulation on the switching voltage present on the line connected to pin 8 of a connector. As a result of this it is not necessary to use a separate pin of the 21-pole scart euroconnector for the identification signal and moreover the detection of said identification signal is simple to realise by the switching device. Since said identification signal is the same for all the connected apparatuses (in fact only the existence of connection is to be recognised) it will suffice to scan sequentially the inputs of the multiplexer. Said scanning is done under the control of the microprocessor 16 which scans the various inputs of the multiplexer and finds out whether a modulation signal is present on one (or more) of said inputs. Upon detection of a modulation signal at a scanned input the microprocessor establishes on which input said modulation signal is present. As a result of this the microprocessor is capable of recognising to which connector an apparatus is connected.

When the microprocessor 16 has established, by means of scanning the inputs of the multiplexer 18, to which connection the apparatus with which a connection is desired is connected and has also established to which connection the apparatus which desires the connection is connected, the switching means 19 are activated under the control of the microprocessor in order to establish a signal path between these apparatuses. The switching means are formed, for example, by a programmable switching matrix.

It will be obvious that a signal path can be established between more than two apparatuses. This may be the case as a result of a detection of an identification signal at more than one input of the multiplexer. The multiplexer 18 is constructed, for example, from a collection of AND gates or from a collection of flip-flops which each have one input connected to a line from the conductor 17.

Let it be assumed that information originating from the video recorder 2 is to be displayed on the TV set 1. From the communication unit 11 of the video recorder 2 a connection request signal is supplied over the bus 14 and via the transceiver 15 to the microprocessor 16. In the microprocessor 16 the source of said signal is known by decoding the connection request signal but the connector to which said source is connected is not known. Hence the microprocessor 16 causes an identification request signal for the video recorder 2 to be supplied over the bus 14. The video recorder then detects this identification request signal and supplies an identification signal via the conductor 17; this identification signal is detected by the microprocessor 16 via the multiplexer 18 and thus connector 7 to which the video recorder 2 is connected has been recognised. From the microprocessor 16 a detection confirmation signal for the video recorder 2 is supplied over the bus 14, as a result of which the identification signal is removed from the conductor 17 in question. By decoding the connection request signal the microprocessor 16 has established that a connection to a TV set is to be established. The microprocessor 16 then generates a report request signal for a TV set and supplies it to the bus 14. In an alternative embodiment a report command which comprises a connection request signal from the switching system is sent to all connected apparatuses via the bus. By decoding such a report command an apparatus is then capable of finding out whether it is specified in the report command or not and, if so, to then generate an identification signal. As a result of this it is not necessary to generate a connection request signal.

By decoding a received report request signal an apparatus finds out whether it may be involved in producing the signal path. This examination occurs, for example, by comparison of an identification, for example, an address or an indication code, incorporated in the report request signal (or in the report command) which in this example indicates that a connection to a TV set is desired. For performing the comparison the communication unit of the TV set comprises a memory element for storing its own key. Said memory element is connected to a comparator in which the own key is compared with the presented key. When the own key corresponds to the presented key this means that the apparatus in question is involved in the signal transmission and an identification signal is generated. By supplying said identification signal via the conductor 17 in question, the switching system is now capable of recognising that the TV set is connected to connector 6. In this case also a detection confirmation signal is now supplied from the microprocessor 16 via the bus connection 14 to the TV set so that it can release the conductor 17 in question. It is now established in the microprocessor that a signal path is to be established between the TV set 1 and the video recorder 2, that the TV set is connected to the connector 6 and that the video recorder is connected to the connector 7; the microprocessor 16 then provides such a control signal to the switching means 19 that therein the signal path is produced between the apparatuses connected to the connectors 6 and 7.

A more complicated system is obtained when all connected apparatuses (i.e. all the apparatuses with the exception of that one from which the connection request signal originates) react to the report request signal from the switching device. Each connected apparatus then reports via pin 8 as a modulation on the signal transmitted via said pin so that identification of all the connected apparatuses is possible. All these signals with modulation identification are detected so that in the microprocessor 16 the desired apparatus can be selected herefrom.

Finally it is to be noted that the switching system 5 may form both a separate unit and may be incorporated in one of the apparatuses, for example, in the TV set 1; in that case the apparatuses 2, 3 and 4 are connected to the TV set, i.e. to the switching device 5 provided therein.

What is claimed is:

1. A method of establishing a signal path among a collection of signal processing apparatuses (1,2,3,4) via a switching device (5) having a plurality of identical multipin connector positions (6,7,8,9) of identical pin configuration, each of at least two of said collection of apparatuses being connected to said switching device via a different one of said identical connector positions, there being no fixed reservation of connector position for said at least two of said collection of apparatuses, said switching device including a bus (14) for transferring commands among said connector positions and said switching device, said method comprising the steps of:

first generating, by a first apparatus of said collection, a report command for the switching device specifying at least one further apparatus of said collection;

first recognizing by the switching device (5), after reception of said report command, the connector position via which the first apparatus is connected to the switching device;

second generating, after the report command has been supplied to the bus, of an identification signal by said at least one further apparatus which was specified in the report command;

transferring said identification signal to the switching device via a predetermined pin location (17), within said pin configuration, of the connector position via which said further apparatus is connected to said switching device;

second recognizing by the switching device, after reception of said identification signal, the connector position via which said further apparatus is connected to the switching device; and establishing, by the switching device, of a signal path between the connector positions via which said first and further apparatuses are connected to the switching device.

2. A method as claimed in claim 1, characterized in that:
a) said first generating said report command comprises first generating a connection request signal, and said supplying step comprises first supplying said connection request signal on said bus;
b) said first recognizing comprises the successive steps of:
  i) receiving, by the switching device, the connection request signal,
  ii) third generating, by the switching device, an identification request signal;
  iii) second supplying said identification request signal via the bus to the first apparatus;
  iv) fourth generating by the first apparatus, upon reception of said identification request signal, of an identification signal;
  v) third supplying said identification signal to the switching device via said predetermined pin location of the connector position via which said first apparatus is connected to said switching device;
  vi) sequentially sensing by the switching device, one connector position at a time, the predetermined pin location for each connector means; and
  vii) third recognizing any connector means having an identification signal at said predetermined pin location.

3. A method as claimed in claim 2, comprising the further steps of:

a) fifth generating, after receipt of the connection request signal, a report request signal by the switching device, which report request signal comprises a key for the further apparatus(es) specified in the connection request signal;
b) transferring the report request signal via the bus to the further apparatus(es) specified; and
c) verifying by each said further apparatus, after receipt of the report request signal, whether the further apparatus is identified by the key and in which the identification signal is generated if the further apparatus has been identified by the key.

4. A method as claimed in claim 3, comprising the further step of presenting the report request signal successively to the further apparatus(es).

5. A method as claimed in claim 2, comprising the further steps of
fifth generating, after recognition of an identification signal, a confirmation signal by the switching device, and
applying the confirmation signal to the apparatus which has generated the identification signal.

6. A method as claimed in claim 1 or any of the preceding claims, characterized in that the identification signal is formed by providing a modulation on the signal transferred via the said pin.

7. A method as claimed in claim 3, comprising the further steps of
sixth generating, after recognition of an identification signal, a confirmation signal by the switching device, and
applying the confirmation signal to the apparatus which has generated the identification signal.

8. A switching device (5) comprising:
a. a plurality of identical connection means (6, 7, 8, 9), comprising respective standard connectors, for coupling with respective signal processing apparatuses via a serial command bus and having a plurality of pins, at least one of the pins being an identity signalling pin for supplying a respective identity signal from a respective signal processing device;
b. processing means (16) for generating identification request signals in response to report commands or connection request signals from a signal processing device;
c. means (18) for detecting a connector which is coupled with a respective signal processing device producing the respective identity signal; and
d. means (19), responsive to the detecting means, for establishing a signal path with the connector detected by the detecting means.

9. An apparatus comprising a switching device having a plurality of mutually identical connection means, each connection means comprising a respective standard connector having a plurality of pins inclusive of at least one identity signalling pin, each connector being connected to a respective signal processing apparatus, said connection means further comprising a serial command bus interconnecting said switching device and any said signal processing apparatus, wherein said arrangement has a report command generator feeding the bus for providing a report command containing a first identification signal identifying at least one particular signal processing apparatus, and wherein any said particular apparatus comprises a report command detector fed by the bus for detecting its own identification signal and thereupon generating an identity signal on its identity signalling pin, wherein the switching device has identity signal detection means connected to the bus and to any identity signalling pin for detecting the connector to which said at least one particular signal processing apparatus is connected, said switching device comprising interconnection means for thereupon establishing a signal path with the connector so detected.

10. Apparatus comprising:
   a. a signal processing apparatus (1, 2, 3, or 4), for selectively communicating with signal processing devices, said apparatus including processing means (10, 11, 12, 13) for
      i. supplying a report command;
      ii. receiving a report command;
      iii. detecting, within a received report command, an identification request signal identifying said signal processing apparatus; and
      iv. supplying, in response to the identification request signal, an identity signal identifying said signal processing apparatus;
   b. a serial command bus (14) coupled with said one signal processing apparatus;
   c. a switching device (5) including:
      i. a plurality of identical connection means (6, 7, 8, 9), for coupling with said respective signal processing devices via the serial command bus, each connection means comprising:
         a respective standard connector, coupled with said serial command bus and having a plurality of pins, at least one of the pins being an identity signalling pin for supplying a respective identity signal from a respective signal processing device;
      ii. means (15, 16, and 18) for detecting which, if any, of the connectors coupled with a respective signal processing device, supplies an identity signal; and
      iii. means (19), responsive to the detecting means, for establishing a signal path with the connector detected by the detecting means.

11. The apparatus of claim 10, wherein the processing means of the switching device supplies a detection confirmation signal to said serial bus in response to said identity signal.

12. Connection apparatus comprising:
   a. a plurality of signal processing apparatuses (1, 2, 3, 4), each including respective processing means (10, 11, 12, 13, and 14) for:
      i. supplying a connection request signal;
      ii. detecting an identification request or report request signal;
      iii. controllably supplying an identity signal, in response to the identification request or report request signal;
      iv. recognizing a detection confirmation signal;
      v. stopping the identity signal in response to the detection confirmation signal;
   b. a serial bus (14) coupled with the signal processing apparatuses;
   c. switching apparatus including:
      i. a plurality of identical connection means (6, 7, 8, 9) for coupling with the signal processing apparatuses, each connection means comprising
         a respective standard connector for coupling with a respective one of said signal processing apparatuses via said serial bus, said connector having a plurality of pins, at least one of the pins being an identity signalling pin for supplying the identity signal from the respective signal processing apparatus;
      ii. means (18) for detecting a connector coupled with the signal processing apparatus supplying the identity signal;
      iii. processing means (16) for:
         A. decoding the connection request signal, to determine a first type of signal processing apparatus supplying the connection request signal and a second type of signal processing apparatus with which connection is sought in the connection request signal;
         B. supplying the identification request signal, in response to the connection request signal, for the first type of signal processing apparatus to identify a location of the signal processing apparatus supplying the connection request signal; and
         C. supplying a report request signal for the second type of signal processing apparatus to identify, by identity signal, the location of the signal processing apparatus with which connection is sought in the connection request signal; and
         D. supplying the detection confirmation signal, in response to the identity signal;
      iv. means (19), responsive to the detecting means and the processing means, for establishing a signal path with the connector detected by the detecting means, whereby a path is established between the first and second types of signal processing apparatus.

13. The apparatus of claim 12, wherein each signal processing apparatus comprises a single identity signalling pin for supplying said identity signal.

14. The apparatus of claim 10 or 12, wherein
   a. the identification request signal comprises a key; and
   b. the processing means of each signal processing apparatus compares the key with a locally stored key.

15. The apparatus of claim 10 or 12, wherein said switching device is located within one of said signal processing apparatuses.

16. Apparatus comprising:
   a. a plurality of signal processing apparatuses (1, 2, 3, 4), each of the signal processing apparatuses including processing means (10, 11, 12, 13) for
      i. detecting, within a received report command, an identification request signal identifying the respective signal processing apparatus; and
      ii. supplying, in response to the identification request signal, an identity signal identifying the respective signal processing apparatus; at least one respective processing means of the signal processing apparatuses also supplying the report command;
   b. a serial command bus (14) coupled with said at least one signal processing apparatus;
   c. a switching device (5) including:
      i. a plurality of identical connection means (6, 7, 8, 9), for coupling with respective signal processing apparatuses via the serial command bus, each connection means comprising:
         a respective standard connector, coupled with said serial command bus and having a plurality of pins, at least one of the pins being an identity signalling pin for supplying a respective identity signal from a respective signal processing apparatus;

ii. means (15, 16, and 18) for detecting one of the connectors which is coupled with a respective signal processing apparatus producing an identity signal; and iii. means (19), responsive to the detecting means, for establishing a signal path with the connector detected by the detecting means.

17. The apparatus of claim 16, wherein only one of signal processing apparatuses supplies said report command.

18. The apparatus of claim 10, 12, or 16 wherein the identity signal has a uniform electrical shape.

19. The apparatus of claim 10, 12 or 16 wherein only one of the pins of each respective standard connector is coupled with the serial bus.

20. The apparatus of claim 10, 12, or 16 wherein exactly two of the pins of each respective standard connector are coupled with the serial command bus.

21. The apparatus of claim 10, 12, or 16 wherein the serial command bus is a one line bus.

22. An apparatus as claimed in any of the claims 10, 12, or 16, characterized in that the standard connection is a 21-pole scart euroconnector.

23. An apparatus as claimed in claim 22, characterized in that the serial command bus is connected to pins 10 and 12 of each 21-pole scart euroconnector and that pin 8 of each 21-pole scart euroconnector is for supplying the identity signal from the respective signal processing apparatus.

24. An apparatus as claimed in any of claims 10, 12, or 16, characterized in that the signal path transfers audio and/or video signals.

* * * * *